United States Patent
Baikov et al.

(10) Patent No.: US 7,673,028 B2
(45) Date of Patent: Mar. 2, 2010

(54) METHOD AND SYSTEM FOR CONTAINER-MANAGED CONFIGURATION AND ADMINISTRATION

(75) Inventors: Chavdar S. Baikov, Sofia (BG);
Dimitar Angelov, Montana (BG);
Vladimir Savchenko, Sofia (BG);
Alexander Zubev, Sveta Troica (BG);
Dimitrina Stoyanova, Elhovo (BG)

(73) Assignee: SAP AG, Walldorf (DE)

( * ) Notice: Subject to any disclaimer, the term of this patent is extended or adjusted under 35 U.S.C. 154(b) by 1175 days.

(21) Appl. No.: 11/238,920

(22) Filed: Sep. 28, 2005

(65) Prior Publication Data
US 2007/0073851 A1 Mar. 29, 2007

(51) Int. Cl.
*G06F 15/173* (2006.01)
*G06F 15/177* (2006.01)

(52) U.S. Cl. .................. 709/223; 709/220; 709/225

(58) Field of Classification Search ......... 709/213–217, 709/220–224, 225
See application file for complete search history.

(56) References Cited

U.S. PATENT DOCUMENTS

| | | | |
|---|---|---|---|
| 6,560,633 B1 | 5/2003 | Roberts et al. | |
| 6,947,943 B2 | 9/2005 | DeAnna et al. | |
| 7,028,223 B1 | 4/2006 | Kolawa et al. | |
| 7,123,980 B2 | 10/2006 | Funk et al. | |
| 7,127,700 B2 | 10/2006 | Large | |
| 7,159,224 B2 | 1/2007 | Sharma et al. | |
| 7,184,922 B2 * | 2/2007 | Ousley et al. | 702/127 |
| 7,231,435 B2 * | 6/2007 | Ohta | 709/221 |
| 7,246,358 B2 | 7/2007 | Chinnici et al. | |
| 7,277,935 B2 * | 10/2007 | Sato | 709/223 |
| 7,284,039 B2 | 10/2007 | Berkland et al. | |
| 7,296,022 B2 | 11/2007 | Harjanto | |
| 7,373,661 B2 * | 5/2008 | Smith et al. | 726/15 |
| 7,409,709 B2 * | 8/2008 | Smith et al. | 726/15 |
| 7,421,495 B2 * | 9/2008 | Yang et al. | 709/224 |
| 7,467,162 B2 * | 12/2008 | Rosenbloom et al. | 707/104.1 |
| 2001/0029604 A1 | 10/2001 | Dreyband et al. | |
| 2002/0067370 A1 | 6/2002 | Forney et al. | |
| 2002/0143819 A1 | 10/2002 | Han et al. | |
| 2002/0178214 A1 | 11/2002 | Brittenham et al. | |
| 2002/0184237 A1 | 12/2002 | McFeely | |
| 2003/0005181 A1 | 1/2003 | Bau et al. | |
| 2003/0014733 A1 | 1/2003 | Ringseth et al. | |
| 2003/0033369 A1 | 2/2003 | Bernhard | |

(Continued)

FOREIGN PATENT DOCUMENTS

| | | |
|---|---|---|
| EP | 1318461 | 6/2003 |
| EP | 1387262 | 2/2004 |

OTHER PUBLICATIONS

Final Office Action from U.S. Appl. No. 10/749,666 mailed Dec. 12, 2007, 11 pgs.

(Continued)

*Primary Examiner*—Hussein Elchanti
(74) *Attorney, Agent, or Firm*—Blakely, Sokoloff, Taylor & Zafman LLP (57) ABSTRACT

A method and system for container-based configuration and administration. In one embodiment, a configuration file is created at a first location. The configuration file is duplicated into a duplicate configuration file, which is placed at a second location.

15 Claims, 8 Drawing Sheets

U.S. PATENT DOCUMENTS

| | | |
|---|---|---|
| 2003/0163450 A1 | 8/2003 | Borenstein et al. |
| 2003/0204612 A1 | 10/2003 | Warren |
| 2003/0208505 A1 | 11/2003 | Mullins et al. |
| 2003/0220925 A1 | 11/2003 | Lior |
| 2004/0054969 A1 | 3/2004 | Chiang et al. |
| 2004/0060057 A1 | 3/2004 | Hansen et al. |
| 2004/0064554 A1 | 4/2004 | Kuno et al. |
| 2004/0068554 A1 | 4/2004 | Bales et al. |
| 2004/0172441 A1 | 9/2004 | Beringer et al. |
| 2004/0194105 A1 | 9/2004 | Shenfield et al. |
| 2004/0243338 A1 | 12/2004 | Sabiers et al. |
| 2004/0267927 A1 | 12/2004 | Davis et al. |
| 2005/0015375 A1 | 1/2005 | Harjanto |
| 2005/0038708 A1 | 2/2005 | Wu |
| 2005/0086664 A1 | 4/2005 | Sundaresan et al. |
| 2005/0096960 A1 | 5/2005 | Plutowski et al. |
| 2005/0114394 A1 | 5/2005 | Kaipa et al. |
| 2005/0154785 A1 | 7/2005 | Reed et al. |
| 2005/0216488 A1 | 9/2005 | Petrov et al. |
| 2005/0246656 A1 | 11/2005 | Vasilev et al. |
| 2005/0251495 A1 | 11/2005 | Woollen |
| 2005/0273703 A1 | 12/2005 | Doughan |
| 2005/0278270 A1 | 12/2005 | Carr et al. |
| 2005/0278417 A1 | 12/2005 | Fremantle et al. |
| 2006/0015513 A1 | 1/2006 | Poyhonen et al. |
| 2006/0015625 A1 | 1/2006 | Ballinger et al. |
| 2006/0029054 A1 | 2/2006 | Breh et al. |
| 2006/0041636 A1 | 2/2006 | Ballinger et al. |
| 2006/0136351 A1 | 6/2006 | Angrish et al. |
| 2006/0173985 A1 | 8/2006 | Moore |
| 2006/0236306 A1 | 10/2006 | DeBruin et al. |
| 2007/0203820 A1 | 8/2007 | Rashid |
| 2007/0245167 A1* | 10/2007 | De La Cruz et al. ............ 714/4 |

OTHER PUBLICATIONS

Office Action from U.S. Appl. No. 10/749.666 mailed Jun. 21, 2007, 6 pgs.

Final Office Action From U.S. Appl. No. 10/749,657 mailed Nov. 15, 2007, 20 pgs.

Office Action From U.S. Appl. No. 10/749,657 mailed Jun. 4, 2007, 20 pgs.

Final Office Action From U.S. Appl. No. 10/749,657 mailed Dec. 15, 2006, 23 pgs.

Office Action From U.S. Appl. No. 10/749,657 mailed Jun. 22, 2006, 19 pgs.

Non-Final Office Action for U.S. Appl. No. 11/239,546 Mailed Dec. 18, 2008, 11 pages.

Non-Final Office Action for U.S. Appl. No. 11/232,660, Mailed Dec. 22, 2008, 22 pages.

Final Office Action for U.S. Appl. No. 11/233,203, Mailed Jan. 27, 2009, 16 pages.

Final Office Action for U.S. Appl. No. 11/238,912, Mailed Feb. 4, 2009, 10 pages.

Non-Final Office Action for U.S. Appl. No. 11/232,717, mailed Feb. 26, 2009, 21 pages.

Final Office Action for U.S. Appl. No. 11/238,244; dated Jun. 2, 2009; 24 pages.

Abdel-Aziz, A A., et al., "Mapping XML DTDs to relational schemas", *IEEE*, (2005), pp. 1-4.

Amer-Yahia, S, et al., "A Web-services architecture for efficient XML data exchange", *IEEE*, (2004), pp. 1-12.

Ege, R K., "Object-oriented database access via reflection", *IEEE*, (1999), pp. 36-41.

Newcomer, Eric , "Understanding Web Services: XML, WSDL, SOAP and UDDI", Indianapolis, IN: Pearson Education, Inc., (2002).

Stoyanova, Dimirtina , "An Apparatus and Method for Web Service Client Deployment", U.S. Appl. No. 11/322,567, filed Dec. 30, 2005—Office Action dated Dec. 31, 2007.

Thomas-Kerr, J , et al., "Bitstream Binding Language – Mapping XML Multimedia Containers into Streams", *IEEE*, (2005), pp. 1-4.

\* cited by examiner

METHOD AND SYSTEM FOR CONTAINER-MANAGED CONFIGURATION AND ADMINISTRATION

TECHNICAL FIELD

Embodiments of the invention generally relate to the field of web service and, more particularly, to a system and method for container-managed configuration and administration.

BACKGROUND

Efforts are being made to more easily conduct business in a web-based environment. "Web Services" is loosely understood to mean the ability to discover and conduct business in a web-based environment. For example, a user (e.g., a web-based application or person with a web-browser) may: 1) search through an on line registry of businesses and/or services; 2) find a listing in the registry for web based access to a service that that the user desires to have performed; and then, 3) engage in a web-based business relationship with the service application including the passing of relevant information (e.g., pricing, terms, and conditions) over the network. In other words, web services generally refer to offerings of services by one application to another via the World Wide Web.

Given the nature and use of web services and the rapid increase in their demand, interoperability of web services across clients and servers is becoming increasing important and cumbersome. Some attempts have been made to achieve interoperability across a wide range of platforms and runtimes. For example, using open standards like eXtensible Markup Language (XML), Simple Object Access Protocol (SOAP), Web Services Description Language (WSDL), and Universal Description, Discovery, and Integration (UDDI), some interoperability has been achieved.

Figure 1:
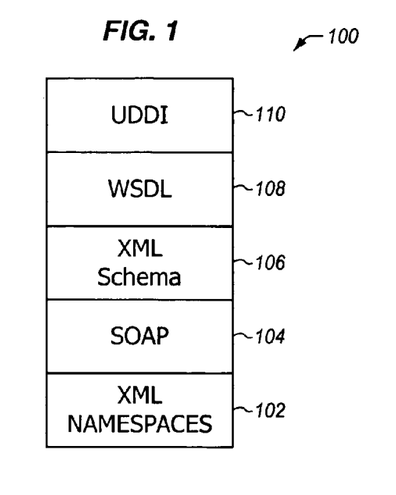
FIG. 1 illustrates a prior art web services platform.

FIG. 1 illustrates a prior art web services platform 100. The platform 100 shows various XML-related standards 102-110 that are used in connection with web services to attempt interoperability. The illustrated standards include XML Namespaces 102, similar to Java package names, to provide syntax for data representation in portable format. SOAP 104 refers to a standard packaging format for transmitting XML data between applications over a network. XML schema 106 refers to the World Wide Web Consortium (W3C) schema specification for XML documents. WSDL 108 is the standard used for describing the structure of XML data that is exchanged between systems using SOAP 104. Finally, UDDI 110 refers to a standard SOAP-based interface for web services registry and defines a set of web services operations and methods that are used to store and search information regarding web services applications.

Figure 2:
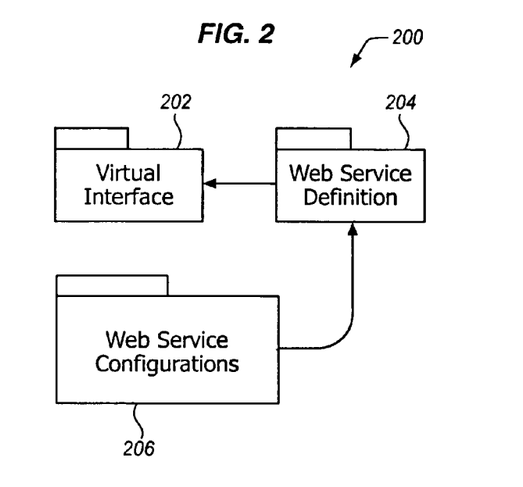
FIG. 2 illustrates a prior art web services model.

However, the open standards are not evolving fast enough to keep up with the increasing demand for web services and needs of additional flexibility and control on the client-side. One of the problems today is the convoluted relationships and mappings between relevant standards. Neither the interoperability nor the client-side flexibility and control are sufficiently achieved because of the conventional separation of models and entities for web services (WS) and web services client (WSC). FIG. 2 illustrates a prior art web services model 200. The illustrated web services model 200 includes Web service definition 204, which includes the description of design-time configuration of a web service. Web service configurations 206 refer to the description of the run-time configurations of a web service. The web services model 200 further includes a virtual interface 202. A virtual interface 202 refers to an abstract interface.

Figure 3:
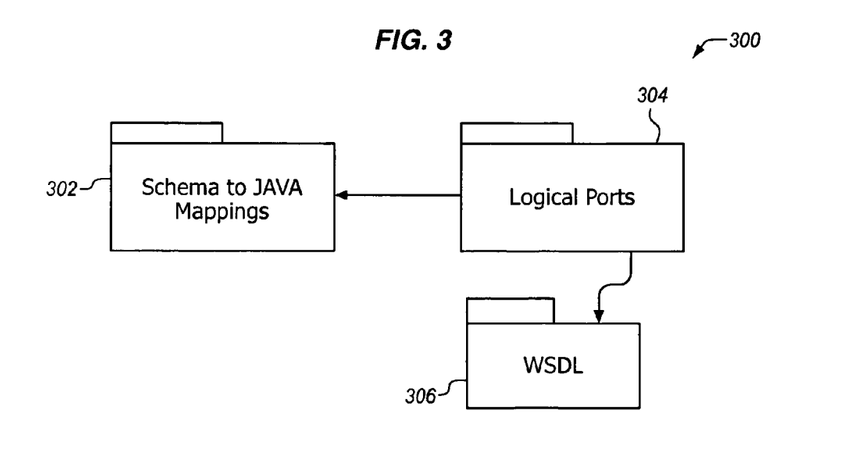
FIG. 3 illustrates a prior art web services client model.

Referring now to FIG. 3, it illustrates a prior art web services client model 300. In the illustrated web services client model 300, schema to Java (STJ) mappings 302 contain serializer classes and deserializer classes of the XML Schema Definition (XSD) Types. However, the conventional STJ mappings 302 do not contain any field or operation-specific mappings. The conventional model 300 further includes logical ports 304 that are limited to containing merely runtime (RT) relevant configurations and do not contain design-time (DT) configurations. Finally, the illustrated WSDL 306 contains a parsed WSDL structure.

Although the conventional models 200, 300 provide some flexibility, further improvements are needed to achieve interoperability. For example, the conventional model 200 provides provider-oriented inside-out approach for web services, but it does not support consumer-based outside-in approach for web services, which is becoming increasingly important. The conventional models 200, 300 do not provide similar modeling approach for developing web services and web services client which leads to usability deficiencies.

SUMMARY

A method and system are provided for container-based configuration and administration. In one embodiment, a configuration file is created at a first location. The configuration file is duplicated into a duplicate configuration file. The duplicate configuration file is then placed at a second location.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Described below is a system and method for container-based configuration and administration. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), Digital Video Disk ROM (DVD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 4:
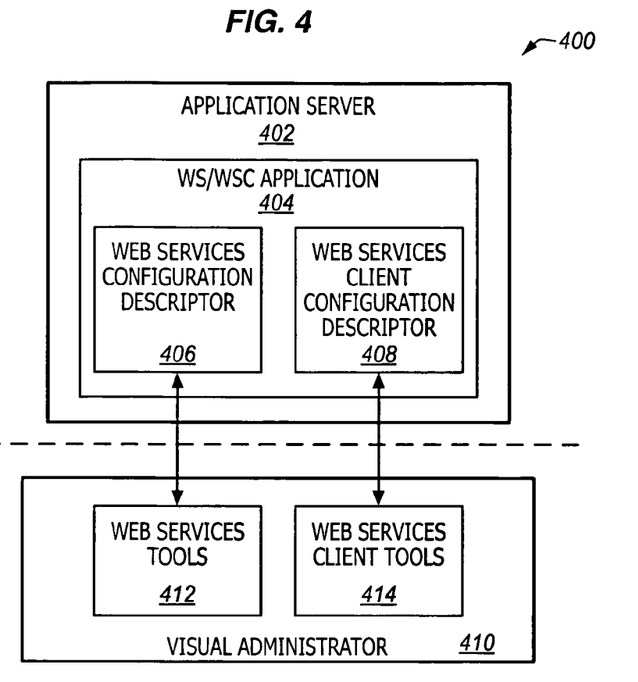
FIG. 4 illustrates an environment for having web services and web services client configuration descriptors residing at a web services/web services client application.

FIG. 4 illustrates an environment 400 for having web services and web services client configuration descriptors 406, 408 residing at a WS/WSC application 404. As illustrated, in the environment 400, two configuration descriptors or files (descriptors) 406, 408 are needed to serve web services and web services client. The two descriptors 406, 408 reside within the application 404 at an application server 402, such as a web application server (e.g., SAP Web Application Server).

Although the application 404 is capable of being used by a number of providers and consumers, separate WS and WSC descriptors 406, 408 are limited to providing merely the provider-oriented inside-out approach. Further, having the descriptors 406, 408 residing at the application 404 necessitates the redeployment of the application 404 each time the descriptors 406, 408 are reconfigured or updated. Typically, a WS descriptor 406 contains interfaces for web services in Java terms, while a WSC descriptor 408 contains interfaces for web services client and mappings for WSDL to Java. The WS descriptor 406 further includes WS deployment descriptions having runtime properties, while design-time properties are often contained in a WS definition file residing at a virtual interface (VI). The WSC descriptor 408 includes logical files having one file for each of the clients for describing points for accessing the client and runtime required to run the client.

As illustrated, separate descriptors 406, 408 also require separate sets of tools 412, 414 at the virtual administrator (VA) 410 to access and view the descriptors 406, 408 and further to serialize and/or deserialize them. Separate descriptors 406, 408 and tools 412, 414 require separate APIs, longer start time, a great deal of resources and yet, they lack in supporting the outside-in approach. Separate descriptors 406, 408 also require separate updating of the descriptors 406, 408 in case of reconfiguration, which requires additional resources. Further, having the descriptors 406, 408 reside at the application 404 requires that the application 404 is redeployed each time the descriptors 406, 408 are amended. Such limitations waste valuable system resources and are limited in the level of service they provide to consumers.

Figure 5:
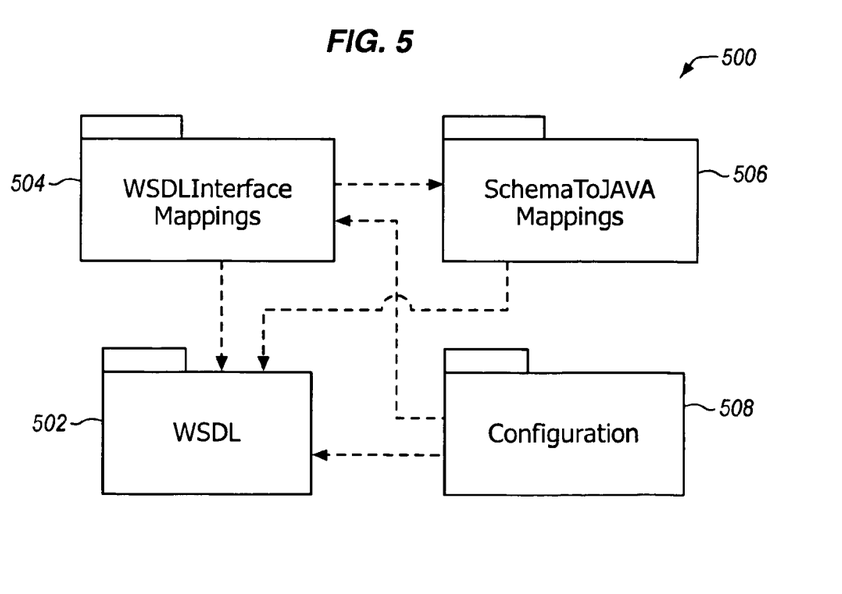
FIG. 5 illustrates an embodiment of a common meta model for web services and web services client.

FIG. 5 illustrates an embodiment of a common meta model 500 for web services and web services client. In the illustrated embodiment, a common web services meta model 500 is generated by combining various models 502-508 into a single common model (common model) 500. For example, the common model 500 includes a WSDL model 502, which refers to a model for describing the WSDL structure of the web services that are developed within an application, and/or WSDL files that are used to generate WS client proxies. The WSDL model 502 may also contain WSDL relevant extensions. The WSDL interface mappings (WSDL IM) model 504 refers to a model for describing mappings between the Java Service Endpoint (JSE) Interface (e.g., generated proxy service interface) and its WSDL representation, such as the names of the Java method and WSDL operation representing the method, default values of parameters, etc.

The illustrated Schema to Java mappings model 506 is used for describing mappings between XSD types and Java classes representing these types, such as the names of the fields. The configuration model 508 includes the design-time and runtime configuration of web services and web services client. The configuration model 508 logically references the WSDL model 502 and the WSDL IM model 504, which, in turn, references the STJ mappings model 506.

As illustrated, in one embodiment, a common model 500 is provided for WS and WSC frameworks to perform development, deployment and configuration of applications with relative ease. WS and WSC frameworks may reside on a Java 2 Enterprise Edition (J2EE) engine. In one embodiment, the common model 500 is migrated to the J2EE engine to run and use the WS/WSC proxy on the J2EE engine to provide a common model for WS and WSC frameworks. Such migration can be performed using various migration controllers and interfaces that are used for application development. In one embodiment, the common configuration is achieved by having a common configuration entity in the configuration model 508. Common design utilities are provided using a common interface mapping model 504 and a common schema to Java mapping model 506, while common deployment entities are provided with insignificant differences between client and server.

In one embodiment, common models 502-508 are managed by a common framework at the J2EE engine. The common model 500 is created by, first, identifying those elements, features, and components (components or properties) that are common to both web services model and web services client model. Once such common components are identified, they are then extracted and put together to create a common WS model. It is contemplated that those components that are necessary and/or preferred are used to create the common framework, while those components that are not regarded as necessary and/or preferred may not be used. Further, the use of such common components helps support the deployment of web services and web services client in a common way. For example, SAP administrative tools model can be converted in light of the common framework to separate the WS tools in the SAP Administrative tools from the J2EE engine because of the different requirements associated with the SAP Administrative tools and the J2EE engine. Examples of administrative tools include various Integrated Development Environment (IDE) tools (e.g., IDE wizard and IDE views) and other SAP-based IDE and administrative tools, such as SAP NetWeaver Developer Studio, SAP Visual Administrator, and SAP NetWeaver Administrator. Further, SAP's IDE can be based on the Eclipse IDE and may contain additional SAP developed plugins.

In the illustrated embodiment, the common model 500 combines the requirements from both the provider and consumer scenarios and is suitable to be used by both the service and client platforms. This is performed such that the common elements of functionality are adopted, while the uncommon elements work side-by-side not only without interfering with each other, but by complementing each other in the common model 500. In one embodiment, common models 502-508 are generated and employed and further, they are directly mapped in a common model 500 via any number of programming languages that are right for the time (e.g., C, C++, C#, Java, and ABAP). Further, a generator, such as a proxy generator or a code generator, modules, interfaces, and components are employed to form common models 502-508, generate WSDL model, form direct mapping between models 502-508 and between web services interfaces and Java interfaces.

The common model 500 eliminates the need for the conventional virtual interface for storing the data (e.g., description of the interface and its types). In one embodiment, web services interface data is separate between the WSDL model 502 and the two mapping models 504, 506. Using this technique, SOAP extensions are not longer necessary as the need for VI to WSDL conversion is eliminated. Using the common model 500, web interfaces are described in the WSDL model 502 as opposed to a virtual interface. Further, the interface mapping information is used to describe the mapping of web interfaces to Java interfaces (e.g., Java SEI). Then, multiple design time configurations can be attached to a single interface as an alternative.

Furthermore, the web services definition, which can be used to describe an alternative design-time configuration, is made part of the design-time part of the configuration model 508. This helps eliminate the need for generating several portTypes based on the web services definition, which would otherwise be necessary because the configuration would have to be expressed in the form of WSDL extensions. In one embodiment, a WS-policy standard is used to express configuration of web services and consequently, several alternative configurations can be expressed using one WSDL portType. A WS-policy standard can be dynamically created in which various parameters can be defined as necessary or desired. Further, a client proxy generated out of such WSDL may contain a single service endpoint interface (SEI), which has a superior use for the application developer using it as proxy. An SEI can be used to specify methods of the Java class that are to be exposed as web services operations, which are included and published in the WSDL model 502 as the portType that a client application uses to invoke web services.

In one embodiment, the STJ mappings model 506 contains not only serializer and deserializer classes, but also other field and operation-specific mappings information. Using the STJ mappings model 506 having such information helps facilitate various kinds of mappings, such as names of getter/setter methods of a specific field, if an attribute is presented as a data member or with getters/setters, etc. Moreover, although the conventional logical ports are limited to containing only real-time configurations, the illustrated embodiment of the configuration model 508 contains and maintains not only real-time configuration information, but also contains and maintains design-time configuration information. Various mapping files and interfaces may be used to map the individual models 502-508 into the common model 500.

The illustrated WSDL model 502 includes a WSDL file that specifies the WSDL structure, including message formats, Internet protocols, and addresses, that a client may use to communicate with a particular web service. Using the basic structure of WSDL, a WSDL document includes an XML document that adheres to the WSDL XML schema. A WSDL document contains various components and elements (e.g., biding, import, message, operation, portType, service, and types) that are rooted in the root element (e.g., definitions element) of the WSDL document.

The binding element is used to assign portTypes and its operation elements to a particular protocol (e.g., SOAP) and encoding style. The import element is used to import WSDL definitions from other WSDL documents (such as those similar to an XML schema document import element). The message element describes the message's payload using XML schema built-in types, complex types, and/or elements defined in the WSDL document's type elements. The operation and portType elements describe web service's interface and define its methods and are similar to Java interfaces and their method declarations. The service element is used for assigning an Internet address to a particular binding. The type element uses the XML schema language to declare complex data types and elements that are used elsewhere in the WSDL document. The WSDL IM model 504 is used for describing the mappings between the Java SEI and its WSDL representation.

The STJ mappings model 506 contains a model for describing the mappings between XSD types and Java classes representing a group of classes and interfaces in Java packages, such as a name which is either derived from the XML namespace URI, or specified by a binding customization of the XML namespace URI, a set of Java content interfaces representing the content models declared within the schema, and a set of Java element interfaces representing element declarations occurring within the schema. The configuration model 508 includes both the design-time and runtime configuration of web services and web services clients. The configuration model 508 may also include one or more description descriptors or files, such as XML configuration files, deployment descriptors, etc.

In one embodiment, the WSDL IM model 504 contains reference to and uses elements of interfaces with the WSDL model 502. The WSDL IM model 504 further contains reference to the STJ mappings model 506. The STJ mappings model 506, on the other hand, references to the WSDL model 502 and uses elements from the WSDL model 502. Examples of the elements that the STJ mappings model 506 uses include elements of XSD and/or type elements, such as complex type and simple type. The configuration model 508 contains reference to the WSDL model 502 and the WSDL IM model 504.

A virtual interface refers to an abstract interface and/or a type description system that is created based on a programming language interface (e.g., Java interface and ABAP methods). A virtual interface can be used to decouple the language-specific implementation from interface description. A web service refers to an interface of the web service as described by the WSDL file at the WSDL model 502, which describes web services methods and web services type systems, such as the XML messages transmitted upon the web services invocation. When the web service interface is generated via the virtual interface, it is done by having Java classes build the virtual interface to generate the WSDL file (web interface). This process of WSDL generation is carried in the engine by the WS runtime, while the virtual interface contains hints for WSDL generation details called SOAP extensions. A WSDL file provides proxy generator which generates Java classes (web services client proxy) and logical ports (that contain web services client configuration). Using the web services client proxy classes, application invoke the web services described by the WSDL file. Also, using logical ports, applications configure the web services client proxy.

In one embodiment, virtual interfaces and the virtual interface model are eliminated by having the web services development based on WSDL (web services interface) at the WSDL model 502 in an outside-in scenario. For example, on the server side, WSDL 502 provides proxy generator which generates default mappings that are then changed (e.g., updated as the desired by the developer or as necessitated) using an administrative/IDE tool, such as an SAP NetWeaver Administrator, IDE wizard, etc. This is then used by the proxy generator to generate Java beans with mapped Java methods and WSDL 502 and mappings and the configuration model 508. A developer can implement methods (logic) of the bean and thus, providing logic to the web services methods. Furthermore, the conventional inside-out scenario can be customized using administrative/IDE tools to be compatible with the new model 500. For example, in one embodiment, Java classes can created a virtual interface that generates default WSDL which proves a proxy generator which further generates default mappings. These default mappings (e.g., default Java mappings) are then changed or updated or customized to reflect the original Java interface for which the common WS model 500 can be used by using/reusing the outside-in deployment. On the client side, in one embodiment, WSDL at the WSDL model 502 provides a proxy generate which generates Java files and mappings and the configuration model 508. This mechanism provides having the same deployment entities for adapting various scenarios (e.g., inside-out and outside-in) and allows the common model 500 for development of such scenarios.

Figure 6:
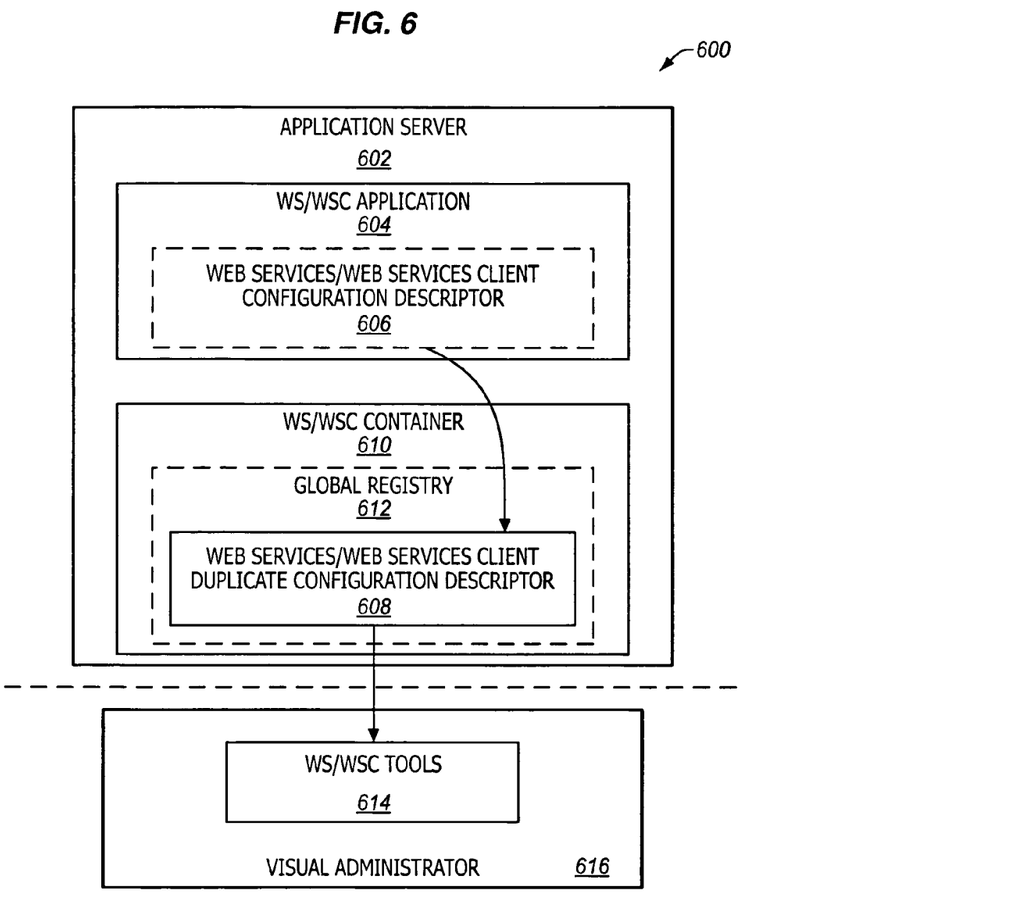
FIG. 6 illustrates an embodiment of an environment for container-based configuration and administration.

FIG. 6 illustrates an embodiment of an environment 600 for container-based configuration and administration. In the illustrated embodiment, a duplicate web services/web services client descriptor (duplicate common descriptor) 608 of the unified web services/web services client configuration descriptor (common descriptor) 606 is placed at a web services/web services client container 610 for providing container-based configuration and administration. First, a single common format may be created to unify the separate formats of the web services and web services client descriptors into the common format. Then, a single common environment or framework (common framework) can be created that is compatible for placing the common WS-WSC descriptor 606. As illustrated, once the common descriptor 606 is achieved, separate tools are not longer necessary and instead, common or unified WS-WSC tools (common tools) 614 are generated and provided at the VA 616 for performing configuration and administration tasks, such as visualizing, accessing, and changing the duplicate common descriptor 608.

For example, using the mapping system and the common model of FIG. 4, the direct mapping of various web services and web services client models is provided and then used to first create the common descriptor 606. For example, using the direct mappings of the common model, direct mapping between the WS and WSC descriptors can be establish to help create a common format for the common descriptor 606, 608 that resides within a common framework. Common tools 614 can be separately created and employed to access and obtain a common view of the common descriptor 606 via the duplicate common descript 608 so that the user no longer has to regard the descriptors for WS and WSC as separate files. Having a common descriptor 606 also provides a faster start runtime since the same file (as opposed to separate files) is to be used. Furthermore, using the common descriptor 606, a common API can be used as both the server API and the client API, a common code can be used for the deployment of the common descriptor 606 instead of using multiple codes, and a common API can be used for various runtime protocols (e.g., security protocol and session protocol). Moreover, since a common format can be used for the common descriptor 606, a common code can also be used for writing, reading, and editing of the common descriptor 606. Having the common descriptor 606 and particular the duplicate common descriptor 608 at the WS/WSC container 610 supports the outside-in approach that is consumer-oriented, while continuing to support the inside-out approach that is provider-oriented.

The common descriptor 606 is created and placed in a WS/WSC application 604. In one embodiment, a duplication module is created and used with a mapping system to duplicate the common descriptor 606 into the duplicate common descriptor 608. The duplication of the common descriptor 606 may also include cloning, regenerating, or creating of a corresponding descriptor of the common descriptor 606. A loading or placing module (placing module) is then generated to place the duplicate common descriptor 608 at the WS/WSC container 610. In one embodiment, the WS/WSC container 610 is separately created and placed at the application server 602. The duplicate common descriptor 608 may be placed in a web global registry (global registry) 612 at the WS/WSC container 610. In one embodiment, the WS/WSC container 610 may contain other web services related components, modules, interfaces, files, and the like.

Having the duplicate common descriptor 608 at the WS/WSC container 610, i.e., outside the application 604, eliminates the need to redeploy the application 604 each time configuration is needed. The common descriptor 606 at the application 604 is maintained at the application 604 may not be redeployed or even changed, while the duplicate common descriptor 608 is repeatedly reconfigured and updated at the WS/WSC container 610. This mechanism supports the consumer-oriented outside-in approach along with the conventional provider-oriented inside-out approach. On the consumer side, providing of the outside-in approach makes it relatively easier for consumers to request changes in the parameter without having to obtain a different version of the application 604 each time such request is made and accepted, while, on the provider side, the outside-in approach reduces the waste of resources and increasing efficiency by not having to require redeploying of the application 604 with each time a request that necessitates reconfiguration is accepted.

In one embodiment, the application lifecycle is integrated into a simpler common application lifecycle. The parts of design, deployment, and configuration of the application lifecycle can be combined such that they are performed by the same user. For example, design, deployment, configuration can be performed by a single developer or administrator instead of the conventional way of being assigned to separate users (e.g., design to the developer, and configuration to the administrator). The design part includes creating interfaces, data services, and code for the application structure and appearance. The deployment part refers to running the application 604 creating during design and to transforming the application by changing the structure of the descriptors into a new structure. The configuration part includes performing configuration and/or reconfiguration of the application 604 after its deployment. Configuration during design time is considered default time, but once the deployment is performed, further configuration can be performed using the duplicate common descriptor 608 at the WS/WSC container 610 without having the need for redeploying the application 604.

Figure 7:
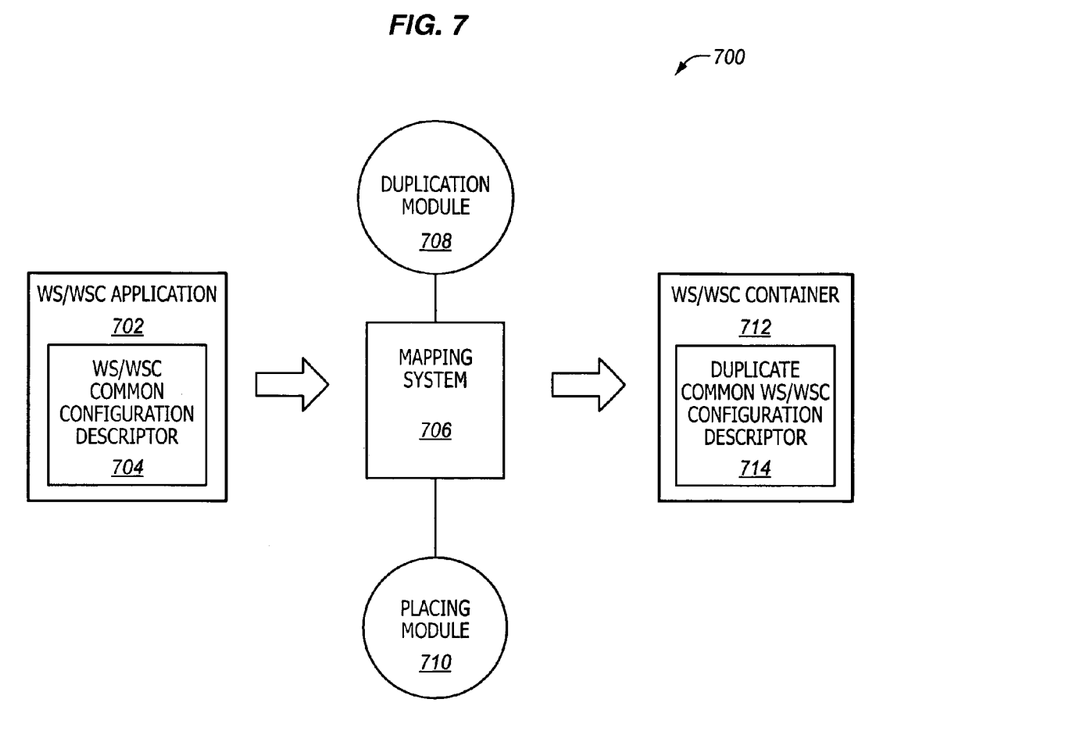
FIG. 7 illustrates an embodiment of an environment for container-based configuration and administration.

FIG. 7 illustrates an embodiment of an environment 700 for container-based configuration and administration. It is contemplated that separate web services and web services client configuration descriptors have been unified into a common WS-WSC configuration descriptor (common descriptor) 704. This common descriptor 704 resides at a WS/WSC application 702. The WS/WSC application 702 resides at an application server, such as a web application server residing at a J2EE engine.

A mapping system 706 that facilitates the generation of a common model, such as the one illustrated in FIG. 4, can be used for this WS/WSC container-based configuration and administration. The mapping system 706 may include the necessary modules, component, and elements to provide a direct mapping of various WS and WSC models (e.g., WSDL model, configuration model, Java to Schema mappings model, and WSDL interface mappings model) into a common model.

In one embodiment, a duplication module 708 is generated to work with the mapping system 706 to facilitate duplication of the common descriptor 704. The duplication module 708 also works with the mapping system 706 to ensure that the duplicate common descriptor 714 is identical to the common descriptor 704 in terms of its components, elements, functionalities, formats, files and the like. Once the duplication is performed and the validity of the duplicate common descriptor 714 is verified, the duplicate descriptor 714 is then placed at the WS/WSC container 712 using a placing module 710. In one embodiment, the duplicate common descriptor 714 may be placed at the global registry of the WS/WSC container 712. It is contemplated that the duplicate common descriptor 714 could also be placed at other suitable locations that are available or are separately generated, such as a temporary file or location where the duplicate common descriptor 714 may be placed until it is moved to the WS/WSC container 712. In this case, the placing module 710 also works as a moving module to move the duplication common descriptor 714 within multiple locations. The placing module 710 works with the mapping system 706 to ensure not only the proper placing of the duplicate common descriptor 714, but also that the mappings of various models (e.g., models of the common model) remain intact. It is contemplated that the duplication and placing modules 708, 710 can be generated using any number of programming languages that are appropriate for the time, such as C, C++, C#, Java, and ABAP.

Figure 8:
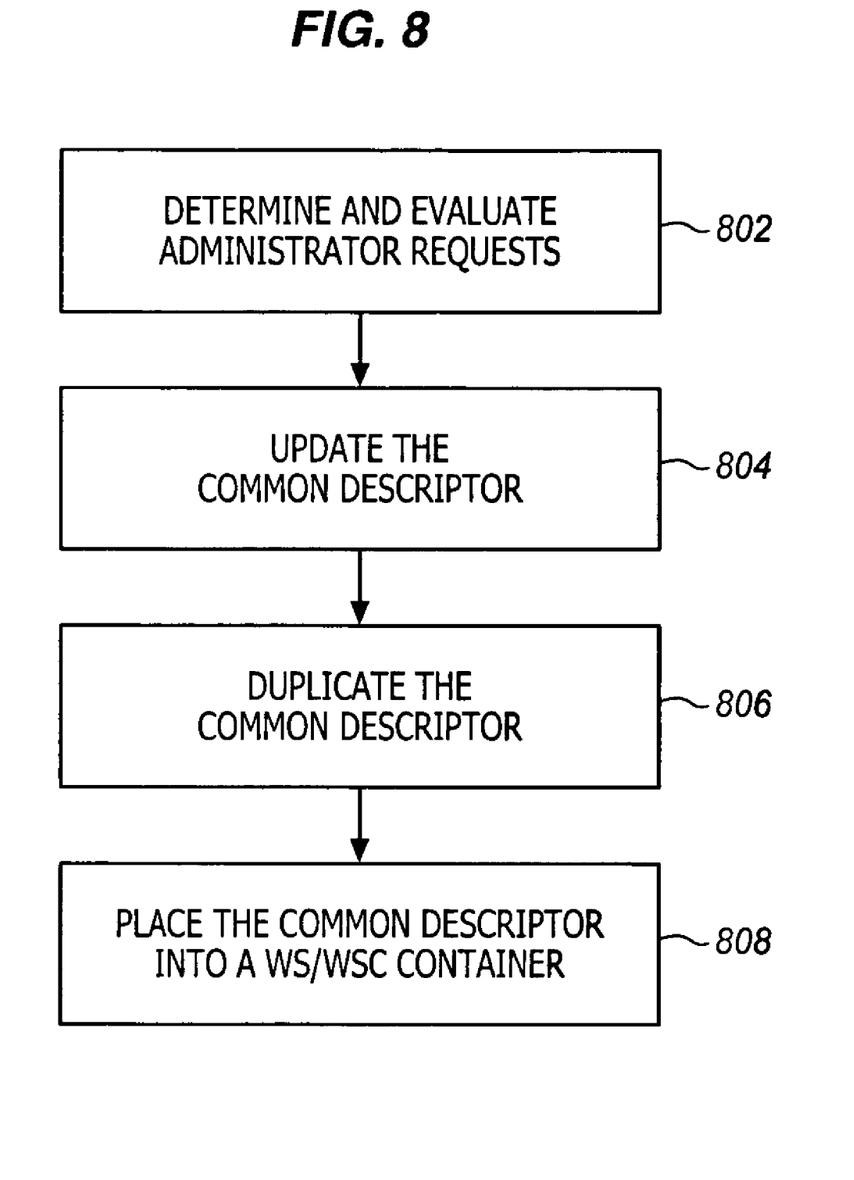
FIG. 8 illustrates a process for performing container-based configuration and administration.

FIG. 8 illustrates a process for performing container-based configuration and administration. First, at processing block 802, various web administrator requests are determined and evaluated. If necessary, the common web services/web services client configuration descriptor is then updated in light of such determination of requests at processing block 804. This is to ensure that various administrator-type requests, such as common requests that require configuration and/or reconfiguration of the common descriptor, are taken into consideration before any attempts are made for duplication of the common descriptor and its placing into a WS/WSC container.

At processing block 806, using a mapping system and a cloning module, the common descriptor is duplicated into a duplicate common descriptor.

In one embodiment, the duplicate common descriptor is then placed into the WS/WSC container using the mapping system and a placing module at processing block 808. In one embodiment, the duplicate common descriptor is placed at a global registry of the WS/WSC container, such that each time the duplicate common descriptor is changed, it is loaded and reloaded into the global registry. This eliminates the need to use other space of the WS/WSC container. The duplicate common descriptor can be placed (short-term or long-term) at another suitable location within or outside of the WS/WSC container. Further, the duplicate descriptor can be a copy, a clone, or a corresponding file of the common descriptor.

Figure 9:
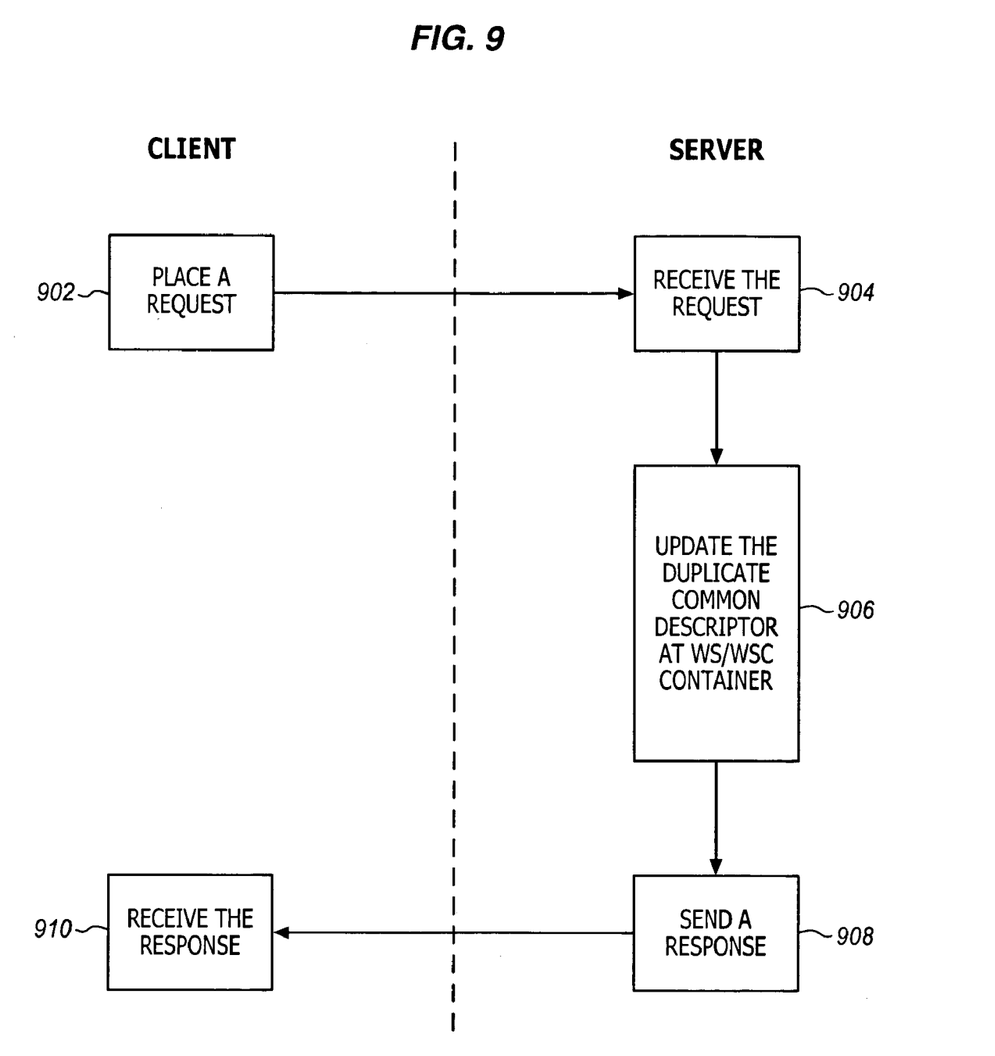
FIG. 9 illustrates a transaction sequence for container-based configuration and administration.

FIG. 9 illustrates a transaction sequence for container-based configuration and administration. A request is placed via a client 902. For example, the user may request a change in the existing authentication/authorization mechanism for accessing a system. For instance, the user requests reconfiguration of the mechanism such that an authentication certificate is also required along with the existing system of requesting user ID and password for additional security. The request is received at the server 904.

To accept the request, the duplicate common descriptor at the WS/WSC container is accessed, reconfigured, and updated at the WS/WSC container to comply with the user's request 906. With that, a new authentication and authentication/authorization system is created, which will now also require an authentication certificate along with a user ID and a password. These tasks can be performed using common tools. Further, having accessed, reconfigured, and updated the duplicate common descriptor at the WS/WSC container eliminates the necessity for accessing the common descriptor at the WS/WSC application and for redeploying the application for the changes to be effective. This technique of container-based configuration provides a friendlier consumer- or user-orientated system, which can absorb any number of user requests with much greater frequency and efficiency since the redeployment of the application is not necessitated. Also, without the need for redeployment of the application, even minor changes can be considered and made without wasting valuable system resources. Once the update is made, a response is prepared and sent to the client 908. For example, the response may include the activation of the new security mechanism, which, as requested, will now require an authentication certificate, a user ID, and a password for accessing a system. The response is received at the client 910.

The architectures and methodologies discussed above may be implemented with various types of computing systems such as an application server that includes a J2EE server that supports Enterprise Java Bean (EJB) components and EJB containers (at the business layer) and/or Servlets and Java Server Pages (JSP) (at the presentation layer). Of course, other embodiments may be implemented in the context of various different software platforms including, by way of example, Microsoft® .NET, Windows®/NT, Microsoft Transaction Server (MTS), the ABAP platforms developed by SAP AG and comparable platforms.

Figure 10:
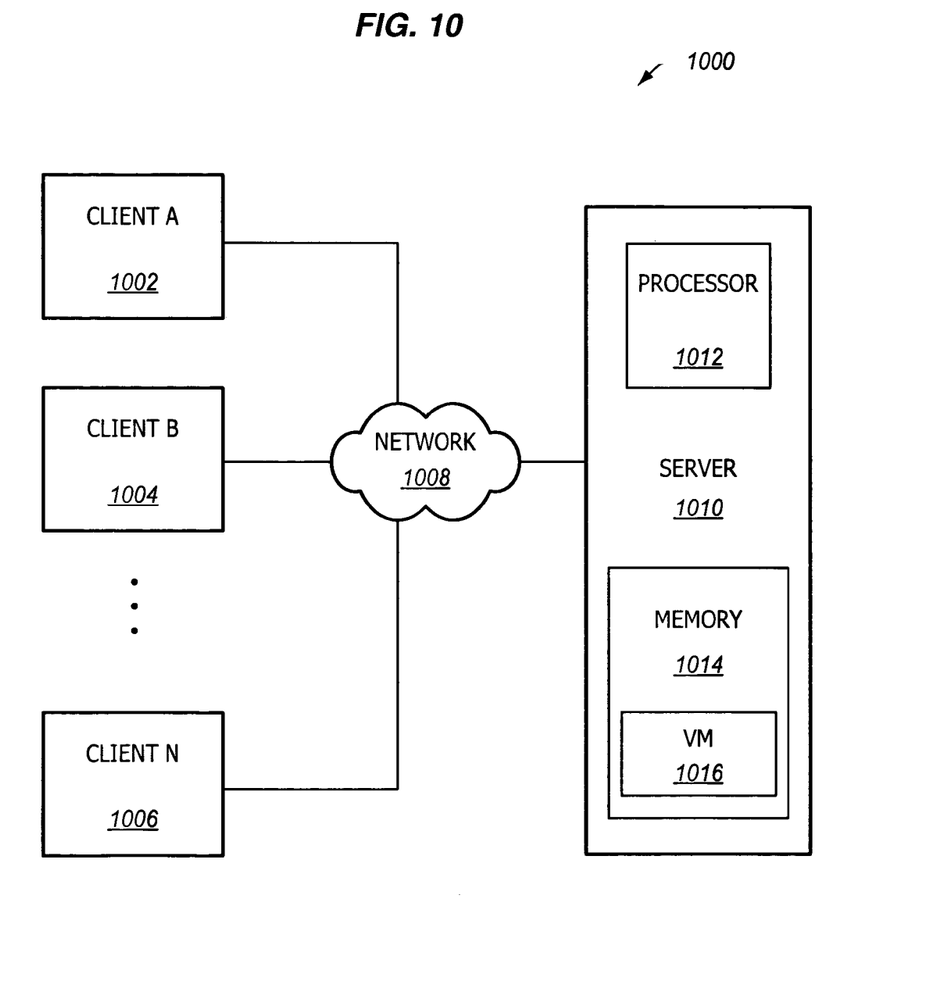
FIG. 10 illustrates an exemplary client/server system used for implementing an embodiment of the invention.

FIG. 10 illustrates an exemplary client/server system 1000 used in implementing one or more embodiments of the invention. In the illustrated embodiment, a network 1008 links a server 1010 with various client systems A-N 1002-1006. The server 1010 is a programmable data processing system suitable for implementing apparatus, programs, or methods in accordance with the description. The server 1010 provides a core operating environment for one or more runtime systems that process user requests. The server 1010 includes a processor 1012 and a memory 1014. The memory 1014 can be used to store an operating system a Transmission Control Protocol/Internet Protocol (TCP/IP) stack for communicating over the network 1008, and machine-executable instructions executed by the processor 1012. In some implementations, the server 1010 can include multiple processors, each of which can be used to execute machine-executable instructions.

The memory 1014 can include a shared memory area that is accessible by multiple operating system processes executing at the server 1010. An example of a suitable server to be implemented using the client/server system 1000 may include J2EE compatible servers, such as the Web Application Server developed by SAP AG of Walldorf, Germany, or the WebSphere Application Server developed by International Business Machines Corp. (IBM®) of Armonk, N.Y.

Client systems 1002-1006 are used to execute multiple applications or application interfaces. Each instance of an application or an application interface can constitute a user session. Each user session can generate one or more requests to be processed by the server 1010. The requests may include instructions or code to be executed on a runtime system (e.g., the virtual machine (VM) 1016) on the server 1010. A VM 1016 is an abstract machine that can include an instruction set, a set of registers, a stack, a heap, and a method area, like a real machine or processor. A VM 1016 essentially acts as an interface between program code and the actual processor or hardware platform on which the program code is to be executed. The program code includes instructions from the VM instruction set that manipulates the resources of the VM 1016.

Figure 11:
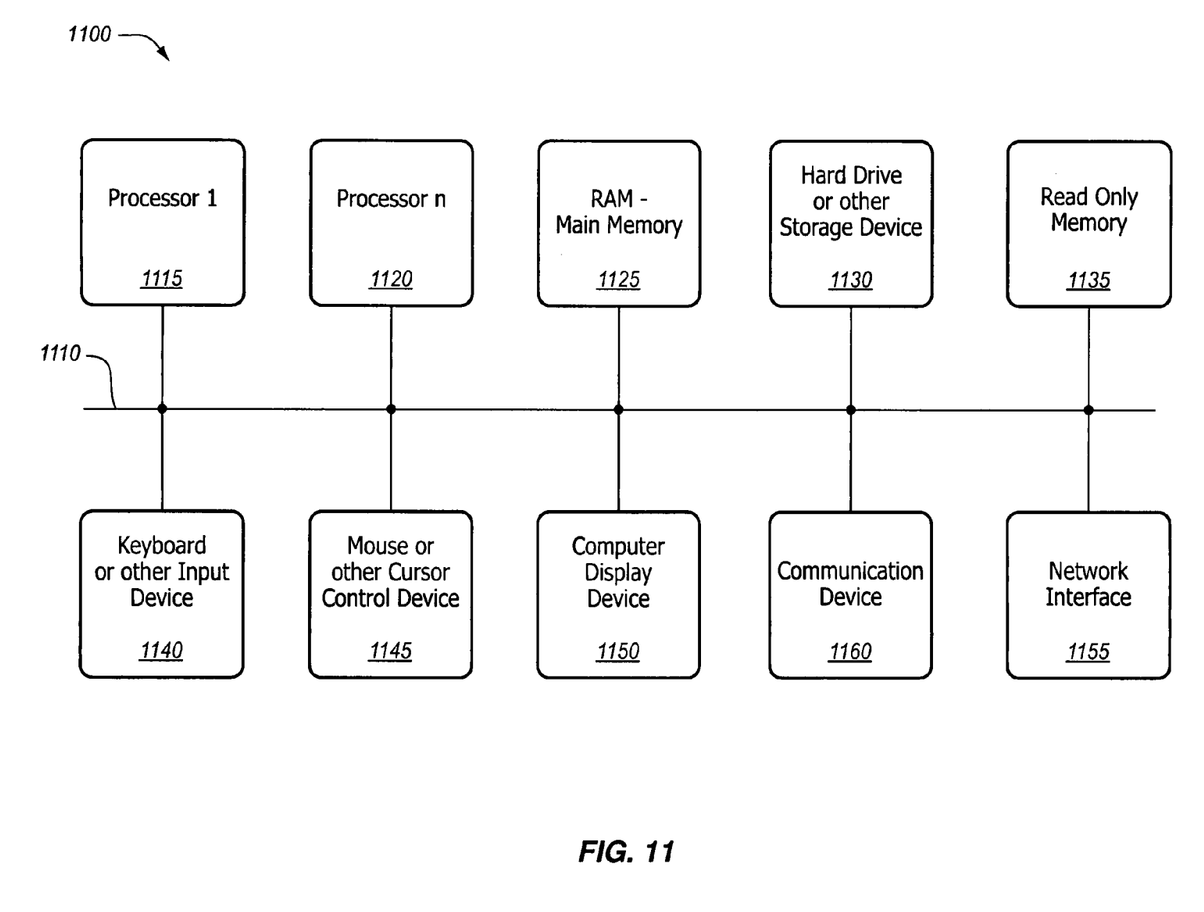
FIG. 11 is an exemplary computer system used for implementing an embodiment of the invention.

FIG. 11 is an exemplary computer system 1100 used in implementing an embodiment of the present invention. In this illustration, a system 1100 comprises a bus 1110 or other means for communicating data. The system 1100 includes one or more processors, illustrated as shown as processor 1 1115 through processor n 1120 to process information. The system 1100 further comprises a random access memory (RAM) or other dynamic storage as a main memory 1125 to store information and instructions to be executed by the processor 1115 through 1120. The RAM or other main memory 1125 also may be used for storing temporary variables or other intermediate information during execution of instructions by the processors 1115 through 1120.

A hard drive or other storage device 1130 may be used by the system 1100 for storing information and instructions. The storage device 1130 may include a magnetic disk or optical disc and its corresponding drive, flash memory or other non-volatile memory, or other memory device. Such elements may be combined together or may be separate components. The system 1100 may include a read only memory (ROM) 1135 or other static storage device for storing static information and instructions for the processors 1115 through 1120.

A keyboard or other input device 1140 may be coupled to the bus 1110 for communicating information or command selections to the processors 1115 through 1120. The input device 1140 may include a keyboard, a keypad, a touch-screen and stylus, a voice-activated system, or other input device, or combinations of such devices. The computer may further include a mouse or other cursor control device 1145, which may be a mouse, a trackball, or cursor direction keys to communicate direction information and command selections to the processors and to control cursor movement on a display device. The system 1100 may include a computer display device 1150, such as a cathode ray tube (CRT), liquid crystal display (LCD), or other display technology, to display information to a user. In some environments, the display device may be a touch-screen that is also utilized as at least a part of an input device. In some environments, the computer display device 1150 may be or may include an auditory device, such as a speaker for providing auditory information.

A communication device 1150 may also be coupled to the bus 1110. The communication device 1150 may include a modem, a transceiver, a wireless modem, or other interface device. The system 1100 may be linked to a network or to other device using via an interface 1155, which may include links to the Internet, a local area network, or another environment. The system 1100 may comprise a server that connects to multiple devices. In one embodiment the system 1100 comprises a Java® compatible server that is connected to user devices and to external resources.

While the machine-readable medium 1130 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 100 and that causes the machine to perform any one or more of the methodologies of the present invention. The term "machine-readable medium" shall accordingly be taken to include, but not be limited to, solid-state memories, optical and magnetic media, and carrier wave signals.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD-ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Furthermore, it is appreciated that a lesser or more equipped computer system than the example described above may be desirable for certain implementations. Therefore, the configuration of system 1100 may vary from implementation to implementation depending upon numerous factors, such as price constraints, performance requirements, technological improvements, and/or other circumstances.

It is noted that processes taught by the discussion above can be practiced within various software environments such as, for example, object-oriented and non-object-oriented programming environments, Java based environments, such as a J2EE environment or environments defined by other releases of the Java standard), or other environments (e.g., a .NET environment, a Windows/NT environment each provided by Microsoft Corporation).

It should be noted that, while the embodiments described herein may be performed under the control of a programmed processor, such as processors 1115 through 1120, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment"

means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A computer-implemented method comprising:
   identifying a plurality of web services (WS) entities that are common to a plurality of software applications running on one or more application servers;
   identifying a plurality of web services client (WSC) entities that are common to the plurality of software applications;
   creating a common WS/WSC file having the plurality of WS and WSC entities that are identified in common, wherein each of the plurality of WS and WSC entities is a portion of the common WS/WSC file; and
   associating the common WS/WSC file with the plurality of software applications such that one or more of the plurality of software applications accesses one or more of the plurality of WS and WSC entities in the common WS/WSC file to update the one or more software applications without interrupting the one or more software applications.

2. The computer-implemented method of claim 1, wherein creating the common WS/WSC file further comprises mapping each WS entity with a relevant WSC entity.

3. The computer-implemented method of claim 1, wherein the plurality of software applications includes one or more server-based software applications or client-based software applications.

4. The computer-implemented method of claim 1, wherein without interrupting comprises without stopping, restarting, or redeploying the one or more software applications.

5. The computer-implemented method of claim 1, wherein updating the one or more software applications comprises reconfiguring or redeveloping of the one or more software applications.

6. A system comprising:
   a computer server system having an application server, the application server configured to:
   identify a plurality of web services (WS) entities that are common to a plurality of software applications running on one or more application servers;
   identify a plurality of web services client (WSC) entities that are common to the plurality of software applications;
   create a common WS/WSC file having the identified common plurality of WS and WSC entities that are identified in common, wherein each of the plurality of WS and WSC entities is a portion of the common WS/WSC file; and
   associate the common WS/WSC file with the plurality of software applications such that one or more of the plurality of software applications accesses one or more of the plurality of WS and WSC entities in the common WS/WSC file to update the one or more software applications without interrupting the one or more software applications.

7. The system of claim 6, wherein creating the common WS/WSC file further comprises mapping each WS entity with a relevant WSC entity.

8. The system of claim 6, wherein the plurality of software applications includes one or more server-based software applications or client-based software applications.

9. The system of claim 6, wherein without interrupting comprises without stopping, restarting, or redeploying the one or more software applications.

10. The system of claim 6, wherein the update of the one or more software applications comprises reconfiguring or redeveloping of the one or more software applications.

11. A machine-readable storage medium storing instructions which, when executed by a computer, cause the computer to:
    identify a plurality of web services (WS) entities that are common to a plurality of software applications running on one or more application servers;
    identify a plurality of web services client (WSC) entities that are common to the plurality of software applications;
    create a common WS/WSC file having the plurality of WS and WSC entities that are identified in common, wherein each of the plurality of WS and WSC entities is a portion of the common WS/WSC file; and
    associate the common WS/WSC file with the plurality of software applications such that one or more of the plurality of software applications accesses one or more of the plurality of WS and WSC entities in the common WS/WSC file to update the one or more software applications without interrupting the one or more software applications.

12. The machine-readable storage medium of claim 11, wherein to create the common WS/WSC file comprises mapping each WS entity with a relevant WSC entity.

13. The machine-readable storage medium of claim 11, wherein the plurality of software applications includes one or more server-based software applications or client-based software applications.

14. The machine-readable storage medium of claim 11, wherein without interrupting comprises without stopping, restarting, or redeploying the one or more software applications.

15. The machine-readable storage medium of claim 11, wherein the update of the one or more software applications comprises reconfiguring or redeveloping of the one or more software applications.

* * * * *